Patented June 15, 1943

2,322,196

UNITED STATES PATENT OFFICE 2,322,196

SULPHAPYRIDINE PROCESS

Elmore H. Northey and Leonard H. Dhein, Bound Brook, N. J., assignors to American Cyanamid Company, New York, N. Y., a corporation of Maine No Drawing. Application March 17, 1942, Serial No. 435,079

6 Claims. (Cl. 260—296)

This invention relates to an improvement in the process of making sulphanilamidopyridines and their alkali metal salts.

2-sulphanilamidopyridine is illustrative of the compounds concerned in the present invention. In the past it has generally been made by a process roughly divisible into two stages. In the first stage 2-aminopyridine is reacted with N-acetylsulphanilyl chloride to form 2-($N^4$-acetylsulphanilamido)-pyridine. In the second stage the 2-($N^4$-acetylsulphanilamido)-pyridine is hydrolyzed to form 2-sulphanilamidopyridine.

The hydrolysis as ordinarily carried out in an aqueous alkali metal hydroxide solution takes place in two steps; the formation of a soluble alkali metal salt at a relatively high pH, usually with considerable remaining free alkali, and conversion of the alkali metal salt to the precipitated 2-sulphanilamidopyridine at an approximately neutral or slightly acidic pH by the addition of mineral acid. Products so produced are usually quite badly discolored unless the soluble alkali metal salt solution is treated with decolorizing carbon or some equivalent after the excess alkali has been neutralized. In addition, a number of recrystallization steps must ordinarily be carried out on the 2-sulphanilamidopyridine in order to remove the final traces of color and impurities. Purity is particularly important since its most important use is as a chemotherapeutic agent.

The present invention relates to an improvement in the second stage of this general process; namely the isolation of 2-sulphanilamidopyridine by hydrolysis of 2-($N^4$-acetylsulphanilamido)-pyridine. In general it comprises the use of sulphur dioxide gas which is bubbled through the aqueous alkaline solution of 2-sulphanilamidopyridine first to neutralize any remaining free alkali and subsequently to convert the sodium salt into 2-sulphanilamidopyridine. This is in contrast to the usual acidification with a mineral acid.

In carrying out the hydrolysis according to the improved process of the present invention, the 2-($N^4$-acetylsulphanilamido)-pyridine is dissolved in an aqueous solution of an alkali metal hydroxide such as sodium hydroxide. This hydrolizes the 2-($N^4$-acetylsulphanilamido)-pyridine to the sodium salt of 2-sulphanilamidopyridine and usually leaves an excess of sodium hydroxide. Since a solution of sodium sulphanilamidopyridine has a pH of about 11.5, sulphur dioxide gas is first bubbled through the aqueous alkaline solution until the pH has dropped to this point in order to neutralize any excess free alkali. This solution is then boiled with decolorizing carbon, filtered and sulphur dioxide bubbled through the filtrate until a pH of between 6 and 7 is obtained. At this point the 2-sulphanilamidopyridine is precipitated in a readily filterable, almost colorless form, which may be purified to a medicinal quality merely by washing and then recrystallizing once from a suitable solvent.

Although the 2-sulphanilamidopyridine precipitated according to this invention is of a wholly unexpected purity, this purity of the product gives the improved process a number of very considerable advantages. Of primary importance is the greatly improved yield which is possible through elimination of several recrystallizing steps ordinarily required in usual commercial practice. In addition, there are also savings in time, labor and equipment over the usual process because of the elimination of the same process steps of recrystallizing.

The invention will be described in greater detail in conjunction with the following specific example which is merely illustrative and not limitative. The parts are by weight.

Example

The 2-($N^4$-acetylsulphanilyl) pyridine resulting from 47 parts of 2-aminopyridine was dissolved in 300 parts of hot water containing 51 parts of sodium hydroxide, boiled for ½ hour to hydrolyze the acetyl group and the solution cooled to 28° C. Sulphur dioxide gas was then bubbled through the solution until the pH was reduced to 11.5, after which decolorizing carbon was added and the mixture again boiled for ½ hour. The mixture was then cooled, filtered, and sulphur dioxide gas again bubbled through the filtrate until a pH of about 7.5 was obtained, at which point precipitation of 2-sulphanilamidopyridine was complete. It was filtered and washed with water giving an almost colorless product which was of superior medicinal quality after recrystallization from alcohol.

While the example relates to the production of 2-sulphanilamidopyridine, the process is applicable to the production of sulphanilamidopyridines in general. For example, the isomeric sulphanilamidopyridines or homologues may, such as 5-sulphanilamidopyridine or a di-(sulphanilamido)-pyridine, be prepared according to this process by the substitution of the appropriate aminopyridine for the 2-aminopyridine of the example. When desired, the 2-sulphanilamido-pyridine, or one of its homologs, may be made into a soluble preparation by forming a salt with an alkali metal, for example by using the desired alkali metal hydroxide, such as that of sodium or potassium, to dissolve the sulphanilamidopyridine and isolating the salt. The resulting alkali metal salts are of improved color and purity if prepared from sulphanilamidopyridines made by the invention herein disclosed.

We claim:

1. In a process of producing 2-sulphanilamidopyridine by hydrolysis of its sodium salt the improvement which comprises passing sulphur dioxide gas through a solution of the salt until the pH is reduced to about 6.5–7.5.

2. In a process of producing a sulphanilamidopyridine by hydrolysis of an alkali metal salt of the corresponding acylsulphanilamidopyridine the improvement which comprises the step of passing sulphur dioxide gas through a solution of the salt until the sulphanilamidopyridine ceases to precipitate.

3. In a process of producing 2-sulphanilamidopyridine in which 2-($N^4$-acetylsulphanilamido)-pyridine is dissolved in an aqueous solution containing an excess of sodium hydroxide over the amount required to hydrolize the 2-($N^4$-acetylsulphanilamido)-pyridine to the sodium salt of 2-sulphanilamidopyridine, the improvement which comprises the steps of passing sulphur dioxide gas through the solution until the pH is lowered to about 11.5, adding decolorizing carbon, boiling the mixture, filtering and passing sulphur dioxide gas through the filtrate until the pH is lowered to about 7.5 whereby the 2-sulphanilamidopyridine is precipitated.

4. In a process of preparing a sulphanilamidopyridine in which the corresponding acylsulphanilamidopyridine is dissolved in an aqueous solution containing an excess of an alkali metal hydroxide over the amount to hydrolize the acylsulphanilamidopyridine to an alkali metal salt of the sulphanilamidopyridine the improvement which comprises the steps of passing sulphur dioxide gas through the solution until the pH is lowered to that of the alkali metal salt of the sulphanilamidopyridine in distilled water, adding decolorizing carbon, boiling the mixture, filtering and passing sulphur dioxide gas through the filtrate until the sulphanilamidopyridine ceases to precipitate.

5. In a process of producing 2-sulphanilamidopyridine in which 2-($N^4$-acetylsulphanilamido)-pyridine is dissolved in an aqueous solution containing an excess of sodium hydroxide over the amount required to hydrolize the 2-($N^4$-acetylsulphanilamido)-pyridine to the sodium salt of 2-sulphanilamidopyridine the improvement which comprises the step of passing sulphur dioxide gas through the solution until the pH is lowered to about 11.5.

6. In a process of preparing a sulphanilamidopyridine in which the corresponding acylsulphanilamidopyridine is dissolved in an aqueous solution containing an excess of an alkali metal hydroxide over the amount required to hydrolize the acylsulphanilamidopyridine to an alkali metal salt of the sulphanilamidopyridine the improvement which comprises the step of passing sulphur dioxide gas through the solution until the pH is lowered to that of the alkali metal salt of the sulphanilamidopyridine in distilled water.

ELMORE H. NORTHEY.
LEONARD H. DHEIN.